United States Patent
Crete

[11] 3,970,835
[45] July 20, 1976

[54] PHOTOGRAPHIC LIGHT SUPPORT APPARATUS

[76] Inventor: Richard C. Crete, 16 South St., Lodi, Calif. 95240

[22] Filed: July 7, 1975

[21] Appl. No.: 593,513

[52] U.S. Cl. ............................ 240/1.3; 240/2 C; 240/52 R; 354/290
[51] Int. Cl.² ........................................ G03B 15/02
[58] Field of Search ............ 240/1.3, 52 R, 67, 2 C; 354/290, 293

[56] References Cited
UNITED STATES PATENTS

| | | | |
|---|---|---|---|
| 2,418,067 | 3/1947 | Carpenter | 240/1.3 X |
| 2,551,753 | 5/1951 | McCullough | 240/52 R |
| 2,629,813 | 2/1953 | Murphy | 240/2 C |
| 3,165,025 | 1/1965 | Hart | 240/1.3 X |
| 3,258,585 | 6/1966 | Crete | 240/1.3 |
| 3,378,678 | 4/1968 | Groff | 240/1.3 |
| 3,550,519 | 12/1970 | Lewis | 240/1.3 X |
| 3,604,913 | 9/1971 | Crete | 240/1.3 |
| 3,783,262 | 1/1974 | Pile | 240/52 R |
| 3,821,766 | 6/1974 | Cowden | 240/2 C |
| 3,851,164 | 11/1974 | Intrator | 240/1.3 |

*Primary Examiner*—R. L. Moses
*Attorney, Agent, or Firm*—Townsend and Townsend

[57] ABSTRACT

A boom and camera support adapted to be carried on a mobile tripod with the boom extending laterally and upwardly from said support. The boom carries a main photographic lighting device on the outer end of an arm swingingly supported at its inner end on the outer end of the boom for movement of said lighting device in an annularly extending generally horizontally disposed path about a vertically extending axis at the outer end of said boom. Said lighting device is at a uniform picture-taking lighting distance from a subject on said axis spaced below said boom.

A second photographic lighting device is supported on the outer end of a second arm that is swingingly supported at its inner end for movement in an annular horizontally disposed path about a generally vertical axis at a point on said boom intermediate its ends. This device includes a fill light.

A third tip light, or lighting device, at the outer end of the boom is supported on the boom for movement longitudinally of the latter outwardly thereof different distances.

Said main and second lighting devices are adapted to be moved to positions at the same side of the boom, or one may be at one side and the other at the opposite side.

Each of the lighting devices includes a strobe light back to back with a quartz or incandescent light directed substantially oppositely outwardly and supported for movement about an axis so the quartz lamp may be employed for television or motion pictures, or may be directed onto a sitter below the outer end of the boom for portraiture. In the latter instance the strobe lights will be directed away from the sitter against a reflector, preferably of the umbrella type to provide the picture-taking light, after the quartz or incandescent light has been turned off.

12 Claims, 10 Drawing Figures

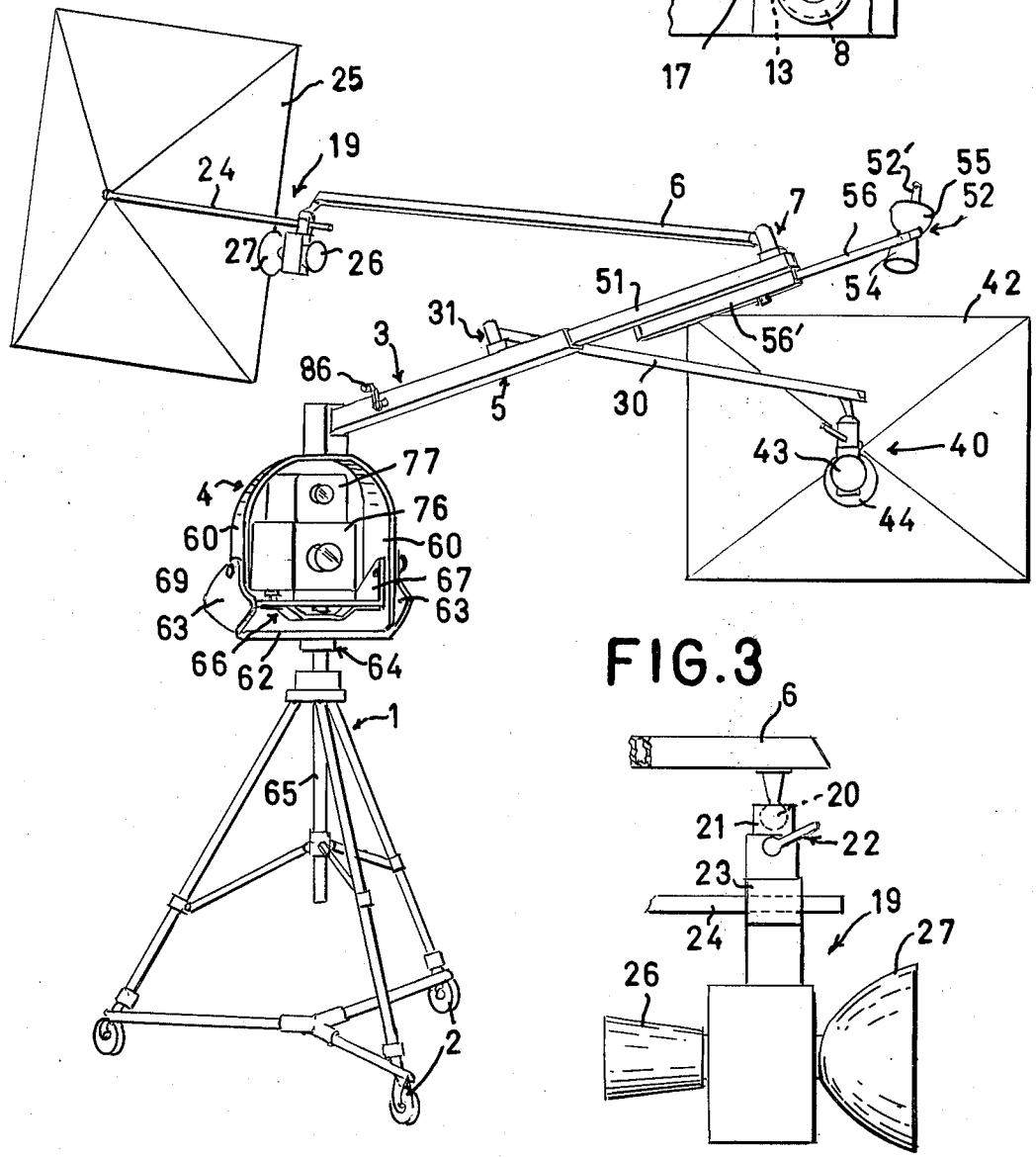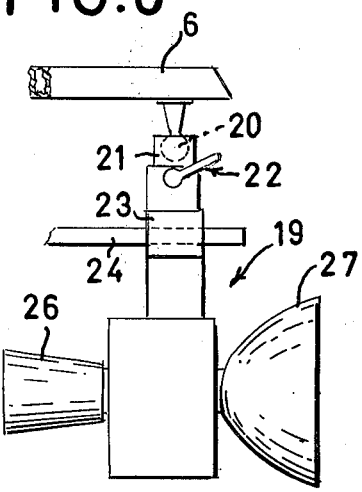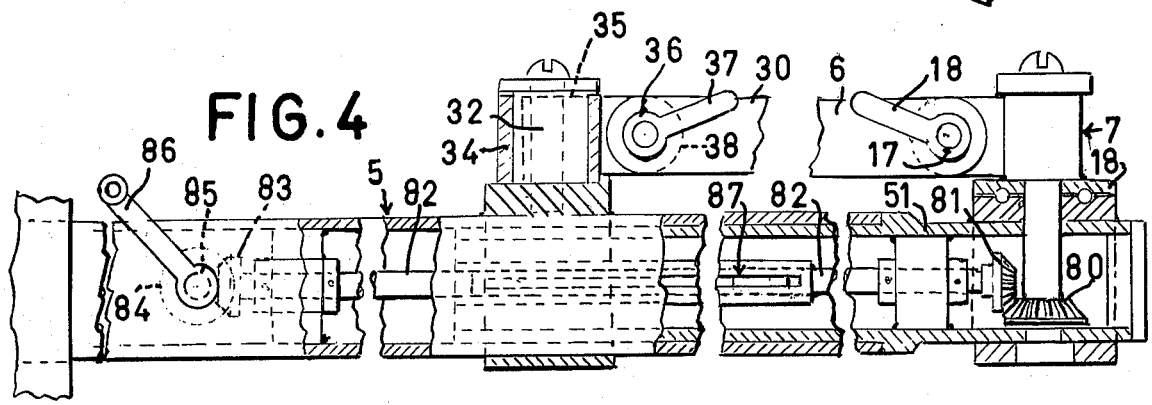

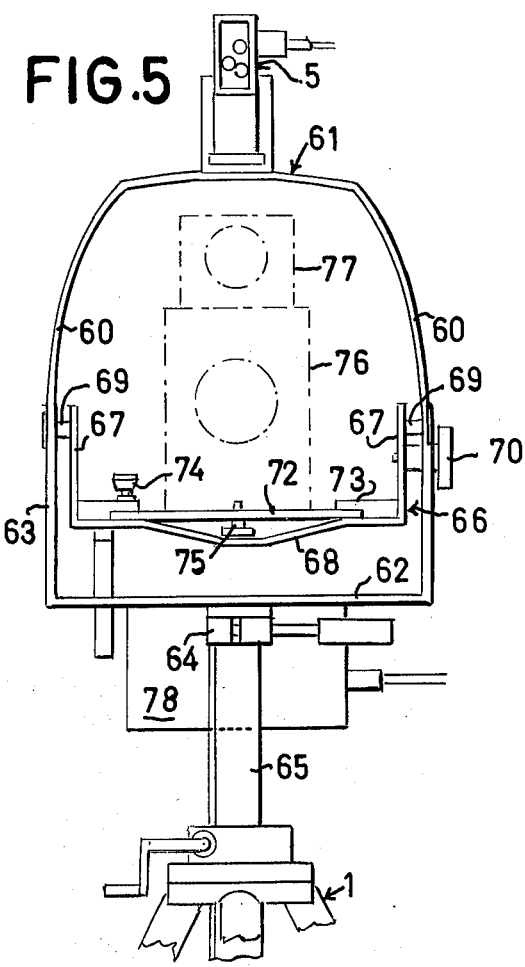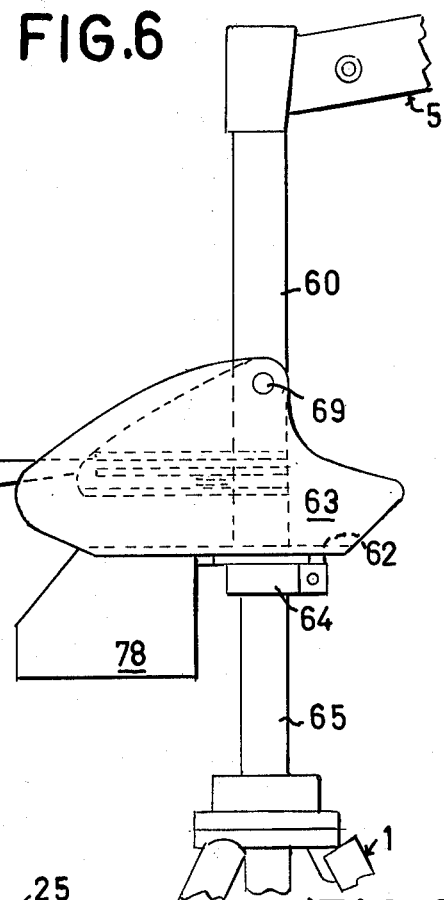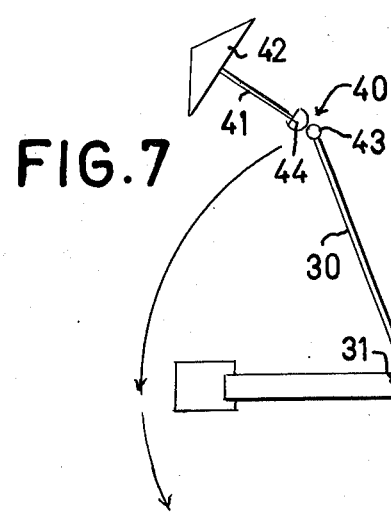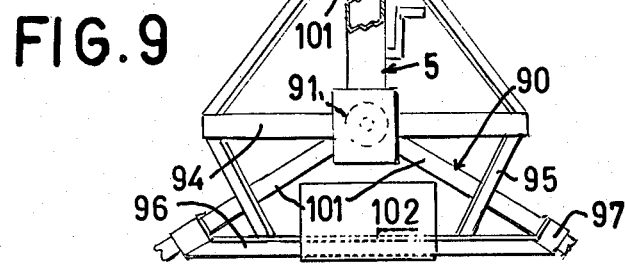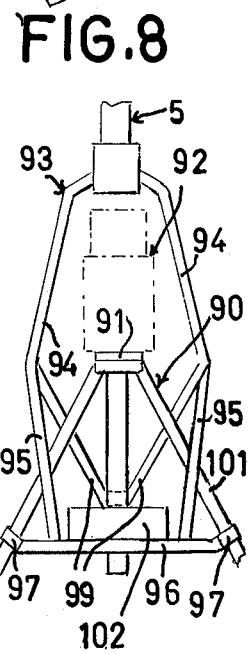

PHOTOGRAPHIC LIGHT SUPPORT APPARATUS

BACKGROUND OF THE DISCLOSURE

Heretofore, in professional portrait photography, usually from six to eight or more lights at different positions have been used in the lighting system in different combinations, and attempts to support a main light in a system so it may be moved to different positions around the subject to be photographed, while maintaining a uniform distance from the subject have been complicated and expensive fixed installations independent of the camera support.

It has also been recognized that in making a natural color photographic portrait by reflecting the main and fill strobe lights, and in many instances the hair light, off umbrella type reflectors, or similar light reflecting areas, the results more closely simulate those obtained from natural sky light or open window light. Heretofore there has been no positive way of knowing where or how the reflected strobe light will "spray" the area or subject in advance of taking the picture.

SUMMARY OF THE INVENTION

One of the objects of the present invention is the provision of a simple, economically made, lighting apparatus that includes a single boom projecting laterally and upwardly from a mobile unit having fewer lights than those heretofore provided for accomplishing the same results in the making of professional portraits, and one of which lights comprise a main lighting device supported on the boom for movement at different levels in horizontally disposed annularly extending path about a subject to be photographed and at the same distance from said subject during movement at each level.

Another object of the invention is the provision of a photographic lighting apparatus that includes a single boom extending laterally and upwardly from a mobile unit and which boom supports lighting units to provide the lighting for television, motion pictures, and portrait photography, and which lighting units each include a quartz or incandescent lamp and a strobe light directed in opposite directions, and supported for reversing the directions of the lights while maintaining them directed in said opposite directions.

A still further object of the invention is the provision of a photographic lighting apparatus that includes a main lighting device and a fill lighting device, each of which comprises an incandescent light and a strobe light, and an umbrella type reflector with the incandescent light directed onto the subject to be photographed and the strobe light directed away from the subject and onto the reflecting surface of the reflector that faces the subject, said lighting devices being supported on a boom having its outer end adapted to be supported over the subject by a mobile camera-support at its inner end for supporting a camera directed toward the subject, with the main lighting device supported on the outer end of the boom for movement in an annular, horizontally extending path above the subject at the center of said path.

An additional object is the provision of a photographic lighting apparatus that includes a boom support and a camera support adapted to be releasably secured on a conventional tripod separate from each other with the boom extending laterally outwardly and upwardly from the boom support and the camera support being the conventional head of the tripod, whereby the boom may be removed from the tripod without removing the camera, and which boom carries the photographic lighting devices.

Another object of the invention is the provision of a photographic lighting apparatus that includes a boom support and a camera support adapted to be supported on a tripod with the boom extending laterally and upwardly from said support and having lighting devices thereon for lighting the subject to be photographed, and which camera support is tiltable relative to the boom support and boom.

Other objects and advantages will appear in the description and drawings.

DESCRIPTION OF DRAWINGS

FIG. 1 is a simplified perspective view of the apparatus, in which the lighting devices, that include the reflectors, are positioned on the same or far side of the boom.

FIG. 2 as an enlarged top plan view of one of the pivot mountings on the boom for one of the arms that project therefrom.

FIG. 3 is an enlarged, fragmentary side elevational view of one of the lighting combinations of each lighting device.

FIG. 4 is an enlarged part sectional, part elevational view of the boom itself showing a means for swinging the arm that is at the outer end of the boom. The boom is broken in length to accomodate the view to the sheet.

FIG. 5 is a front elevational view of the camera and boom support on a tripod, the upper end only of the latter being shown, and the camera and view finder being indicated in broken lines.

FIG. 6 is s side elevational view of the support shown in FIG. 5.

FIG. 7 is a semi-diagrammatic top plan view showing the apparatus, in which view the position of the subject to be photographed is indicated by a circle, and an extensible light and reflector are shown at the outer end of the boom in full line, and in extended position in broken lines.

FIG. 8 is a rear view of a modification of the boom support in which the support is carried by the legs of the tripod instead of the head, with the camera and viewfinder indicated in broken lines.

FIG. 9 is a top plan view of the support shown in FIG. 8.

DETAILED DESCRIPTION

Figure 10:
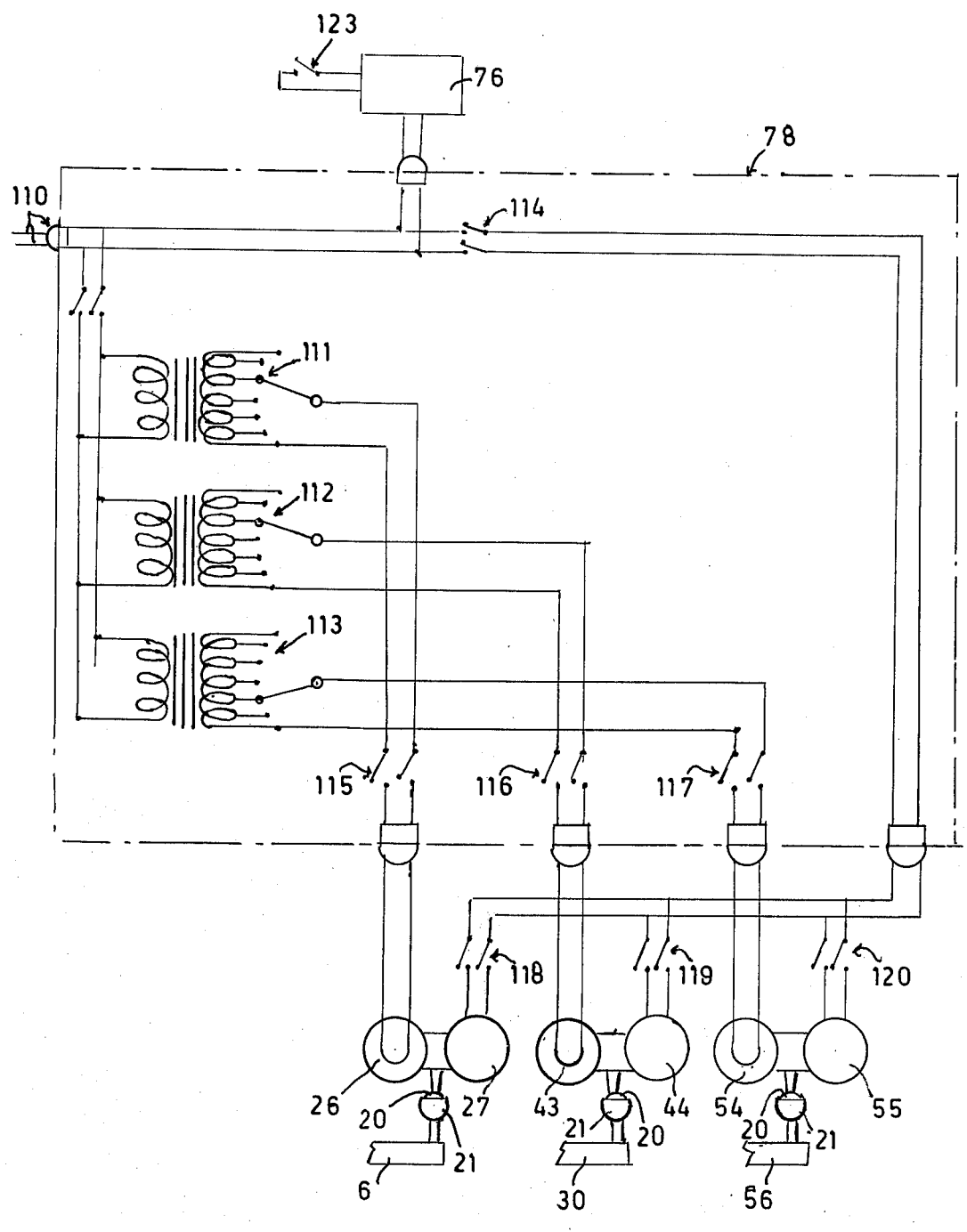
FIG. 10 is a simplified schematic view of the lighting circuit.

In the description the word "incandescent" referring to one of the lights or lamps of the lighting devices is intended to include quartz lights or lamps.

Referring to FIG. 1, a tripod 1 supported on wheel 2 supports the photographic lighting apparatus, generally designated 3, for movement over the floor in any horizontal direction.

A boom support, generally designated 4, on the upper end of said tripod, supports one end of a laterally outwardly and upwardly extending boom 5.

An arm 6 has an inner end that is pivotally secured to the outer end of boom 5 by a fitting 7 that includes a vertically extending shaft 8 (FIG. 4), which shaft is enlarged at its upper end and projects above the boom. The lower portion of shaft 8 rotatably extends into boom 5, said boom being hollow and of rectangular cross sectional contour. Shaft 8 is rotatably supported on the boom by bearings including bearing 10. By this structure arm 6 is supported on the outer end of boom 5 for swinging horizontally about the axis of shaft 8.

An ear or lug 11 projecting laterally from the upper end portion of shaft 8 is pivotally connected with clevis 12 (FIG. 2) by a horizontal pivot 13 for vertical swinging of arm 6 to any desired position in a vertical plane extending above and below said pivot 13. One side of the clevis 12 may be secured to one end of pivot 13 for releasably clamping arm 6 in any position relative to horizontal or horizontal. The end of pivot 13 opposite to side 15 has a quick acting nut 17 provided with an arm 18 for manually rotating the nut to effect a quick release and clamping of the arm in the adjusted position.

A photographic lighting device, generally designated 19, includes a ball 20 secured on the outer end of arm 6, and a socket 21 in which the ball is releasably clamped by a convential clamping element 22. Rigid with the socket member 21 is a block 23 through which extends the stem 24 of a conventional umbrella type reflector 25. Said stem is slidable through block 23 and is frictionally held in adjusted position, thereby enabling the reflector to be different distances from the block.

Electric lights 26, 27 are carried by the block 21, the light 26 being a convential incandescent light, while light 27 is a convential strobe light. Light 26 is directed onto the sitter or subject in a position spaced directly below the fitting 7, or outer end of boom 5, which position is indicated by circle 28 (FIG. 7). The strobe light 27 is directed away from the subject and toward the reflecting surface of the umbrella reflector 25. Lights 26, 27 are preferably positioned back to back so that the character of the luminance of the light reflected from the subject at 28, and studied and adjusted by the operator at the viewfinder of the camera, will be repeated by the strobe light, after the incandescent light is turned off and the strobe light is fired to take the picture. It is important to note that the lighting device 19 can be moved through an arc of 180° disposed between the camera and the subject during the examination of the modelling of the main light on the subject and at different levels during said movement.

A second arm 30 is pivotally and swingably supported by a fitting, generally designated 31, on boom 5 at a point along said boom spaced between the outer end of the latter and its inner end. Fitting 31 includes a vertically extending post 32 (FIG. 4) that is supported on a base 33 that, in turn, is rigidly secured on the boom. Post 32 and the upper end of shaft 8 project upwardly from boom 5, although both or either could project downwardly from the lower side. Post 32 provides a pivot for the inner end of arm 30, and a split bearing 34 releasably extends around the post, one side 35 of which is adapted to be releasably clamped against post 32 by a clamping nut 36 having a manually actuatable handle 37 for tightening and loosening side 35. Bearing 34 has a lug 38 corresponding to lug 11, and the end of arm 30 has a clevis between the sides of which lug 38 extends. Upon tightening nut 36 arm 30 will be held in its adjusted position.

It should be noted that the arms 6 and 30 are preferably supported above the boom and may be tilted upwardly, if necessary, for clearing the boom upon being swung from one side to the other, and the lighting device on the outer end of arm 30 may be closely adjacent the camera in one of its positions.

A lighting device, generally designated 40 corresponds to lighting device 19, and is on the outer end of arm 30. This device includes the ball and socket mounting for stem 41, incandescent lamp 43 and strobe light 44. Strobe lights 27, 44 may both include reflectors and are directed toward the umbrella reflectors while lights 26, 43 are directed toward the subject.

The boom may be a single tubular member for basic studio portraiture, but preferably it comprises a pair of members in which arm 6 is on the outer end of a member 51 that is telescopically fitted within the inner portion that is supported on the boom support 4, and which member 51 is extendable longitudinally outwardly of said inner portion. The position of the subject at 28 may thus be different distances from the camera, but the advantage of having the main lighting device the same distance from the subject during movement around the subject remains the same.

Whether the boom is extendable or not, a tip light 52 at its outer end is desirable. This tip light may include all of the elements of the lighting devices 19, 40 such as an umbrella type reflector 53 (FIG. 7), an incandescent light 54 and a strobe light 55. The lighting device 52 will provide a hair light, or a light for the background. In order to accomplish the backlighting of the subject, it is preferable that the lighting device 52 be mounted on a tubular arm 56 (FIG. 1) telescopically fitted in a tubular support 56 secured on the outer end portion 51 of the boom for movement longitudinally of the latter to one of different extended positions indicated in broken line position 53 (FIG. 7).

The tip light provides for back lighting, hair lighting, or background lighting, where desired in portraiture and the incandescent light of the lighting device may be used in making motion pictures or for television work.

Referring to FIGS. 1, 5 and 6 the boom support 4 comprises an upright frame having open front and rear sides, two corresponding relatively narrow vertically extending opposed side walls 60, a top wall 61, and a horizontal bottom wall 62. Horizontally extending outer side pieces 63 extend upwardly from two opposite edges of the bottom wall against the oppositely outwardly facing sides of the lower portions of sides 60 to which they are welded or otherwise rigidly secured.

Bottom wall 62 is relatively wide and is removably secured on head 64 that is on the upper end of the vertical post 65 of tripod 1. Said head is rotatably supported on post 65 and is releasably locked to hold it stationary on the post in one of many different adjusted positions, and post 65 is adapted to be raised and lowered and releasably locked in adjusted position in the usual manner. Thus the boom and the lighting devices thereon may be raised and lowered and swung horizontally about the vertical axis of head 64.

A U-shaped cradle, generally designated 66 (FIGS. 1, 5, 6) having upstanding sides 67, and a horizontally disposed bottom 68, is suspended from the upper ends of sides 67 between side walls 60 by coaxial pivots 69 carried by said side walls. A manually actuatable locking screw 70 releasably locks the cradle 66 in adjusted position within the boom-supporting frame to support the bottom 68 in the desired position relative to horizontal.

A horizontally disposed plate 72 (FIG. 5) is slidably supported for movement forwardly out of the cradle in guides 73, and is releasably locked against movement by locking screw 74. A conventional camera-securing screw 75 extending through place 72 is adapted to releasably secure the camera 76 having the viewfinder 77 thereon to plate 72 with the camera and finder lens directed forwardly through the forward open side of the boom-supporting frame.

The bottom wall 62 may carry along its rear edge the usual components for actuating the camera, lights and controls, which may be in a control box 79.

In operation, in the making of a portrait, the sitter is positioned below the outer end of the boom, or directly below the fitting 7, and the main lighting device 19 is usually positioned to one side, generally as indicated in FIG. 7. The main incandescent light 26 is turned on thus enabling the photographer to obtain an accurate focus, and with the light adjusted to height the arm 6 may be moved in its arc about shaft 8.

To facilitate the examination of the sitter under light 26 to see what actually will be obtained in the way of modelling from the main strobe light, provision is made for moving the arm 6 by the operator at the viewfinder while the sitter is being viewed under light 26.

Shaft 8, forming the pivot about which arm 6 is moved has a bevel gear 80 thereon (FIG. 4) in mesh with a bevel gear 81 secured on the outer end of shaft 82. Shaft 82 extends longitudinally of boom 5 within the latter, to its inner end and a bevel gear 83 on said inner end is in mesh with a bevel gear 84 on a vertically extending shaft 85. Shaft 85 is rotatably supported in bearings on said boom, and a manually actuatable crank 86 is secured on shaft 85 outside the boom in a position accessible to the operator at the viewfinder 77 while the operator is viewing the sitter at 28. Actuation of the crank 86 will effect swinging of arm 6 and lighting device 19 in the arcuate path from one side of the sitter to the other side.

Shaft 82 includes a splined connection 87 that enables rotation of the same at any degree of extension of the boom, the shaft being rotatably supported at one end within the inner end portion of the boom and at the other end within portion 51.

The fill light 43, when turned on, will enable the photographer at the viewfinder to quickly discover any reflection from eye glasses that may be on the sitter, and will also indicate the actual (spray of light that will come from the strobe light 44 when the latter is actuated. The tip light 54 will show the spread of light from the strobe light 52 when the latter is actuated. In other words, what the photographer sees from the actuation of the incandescent lights is what will appear in the picture resulting from actuation of the strobe lights. It is important that the incandescent lights be turned off before the strobe lights are actuated, otherwise the result will be an overexposure.

In the modification shown in FIGS. 8 and 9, the tripod, generally designated 90 is a standard studio tripod having a standard head 91 having a central screw adapted to threadedly engage a threaded opening in the base of a standard camera for securing the camera on the tripod head. The camera is indicated in broken lines at 92 and has a viewfinder thereon, which correspond to the camera and viewfinder of FIG. 5.

The boom and lighting devices are the same as shown in FIGS. 1–4, the inner end of the boom 5 being shown in FIGS. 8 and 9.

The boom support comprises a frame, generally designated 93, having an inverted U-shaped portion, the upper side of which comprises the socket for receiving and holding the inner end of the boom 5. Legs 94 extend divergently downwardly from two opposite sides of the socket (FIG. 5) to points approximately at two opposite sides of the head 92 on the tripod. Continuations 95 of said legs 94 extend convergently downwardly and connect at their lower ends with a lower horizontally extending base member 96. The end portions of said base member are generally of channel shape to fit over and receive two of the legs 98 of the tripod in the same manner as is shown in the tripod supported shelf or tray in my U.S. Pat. No. 3,830,168 of Aug. 20, 1974.

At the junctues between legs 94 and their continuations 95, a pair of braces 99 extend convergently downwardly to a channel piece 100 secured to their lower ends (FIG. 8), which piece 100 fits over and receives the third leg 101 of the tripod (FIG. 9).

By the foregoing structure the boom is removably supported on the tripod independtly of the camera, hence the camera may be elevated within the vertical limits of the boom support, and rotated and tilted independently of the boom support, and the boom support may be bodily lifted with the boom, as a unit, off the tripod or be replaced on a tripod.

Referring to FIG. 10, the control circuit is mostly within the box 78, and connects with a source of power at inlet 110. Said circuit includes variable transformers 111, 112 and 113 in the circuit to the incandescent or quartz lamps 26, 43, 54 for selectively varying the intensities of the lights therefrom.

In television and motion picture work, the strobe lights and reflectors therefor would normally not be used, hence switch 114 may be actuated to disconnect them, and switches 115, 116, 117 may be actuated to turn all of the lamps 26, 43, 54 or such as may be desired.

The ball supports 20, 21 enable rotating and tilting each of the lighting devices 19, 50, 52 independently of each other so the rays of light from lamps 26, 43, 54 may be directed forwardly of the boom, or laterally or inclined upwardly or downwardly in each of their different positions, which is particularly desirable for television and motion picture work where the cameras may be supported separately from the camera support.

The camera 76 and its shutter are in the circuit in the conventional manner with the strobe lights, being fired upon actuation of the switch 123 to actuate the shutter.

The strobe lights at the tip, the main and fill are normally of different watt-second values, according to the conditions of the set-up for portrait photography and the results or effects desired. With the simple apparatus as described, the photographer is equipped for most photographic demands in a studio, whether of individual portraits or group picutes, or for motion picture or television work, insofar as the lighting is concerned.

I claim:

1. Photographic lighting apparatus comprising:
   a. a mobile boom support having a boom thereon extending laterally outwardly and upwardly therefrom providing an inner end at said support and an outer end spaced therefrom at a height spaced above a person to be photographed when such person is directly below said outer end;
   b. a first arm and a second arm;
   c. separate pivot means respectively supporting said first arm at one end thereof on the outer end of said boom, and supporting said second arm at one end thereof on said boom at a point intermediate said inner end and said outer end for movement of said first and second arms about their said one ends in generally horizontally disposed arcuate paths between positions projecting oppositely outwardly from said boom;

d. a lighting device on each of the ends of said arms that are remote from said boom, each including electrical photographic lighting means in an electrical circuit extending to said boom support; and e. mounting means supporting each of said lighting devices for substantially universal movement relative to said arms.

2. The apparatus as defined in claim 1, in which:

f. said first arm and said second arm are supported by said pivot means for swinging across the upper side of said boom from one of said positions at an angle of approximately 90 degrees to said boom, to a position at the other side at approximately the same angle relative to the boom;

g. holding means for releasably holding each of said arms stationary at any point during their said swinging from one side of the boom to the other;

h. the length of said second arm being such as to support the lighting device thereon adjacent said boom support when said second arm is swung to a position extending generally longitudinally of said boom; and i. a camera support adjacent the inner end of the boom.

3. The apparatus as defined in claim 1, in which there is:

f. a third lighting device carried by said boom at its outer end in said electrical circuit.

4. The apparatus as defined in claim 3, including:

g. a third arm supporting said third lighting device on said boom for movement relative to said boom longitudinally thereof to different distances outwardly of the latter.

5. The apparatus as defined in claim 3, in which:

f. each of said lighting devices includes a light bulb for producing a continuous light when energized and control means in said circuit for varying the intensity of the light so produced by each bulb.

6. The apparatus as defined in claim 2, including:

j. means on said camera support for supporting a camera thereon for movement with said boom with its lens directed toward a sitter when the latter is positioned directly below said outer end of said boom substantially on the axis of rotation of said first arm on its pivot means whereby the lighting device on the outer end of said first arm will be at a substantially uniform distance from such sitter at all points in the path of the lighting device on said first arm during said swinging thereof;

k. each of said lighting devices including a strobe light and a continuous type electrical light bulb in said circuit;

l. means supporting said strobe light and said bulb in each lighting device directed oppositely outwardly for directing the light from each bulb directly on a sitter and for directing the light from said strobe light at the same time away from the sitter; and m. each lighting device further including reflector means for reflecting the light from each strobe light onto such sitter; and n. control means in said circuit for selectively energizing said bulbs during movement of said arms and for firing said strobe lights, and for de-energizing said bulbs before firing said strobe lights.

7. The apparatus as defined in claim 1, including:

f. actuating means extending from said boom support to said first arm for moving said first arm about its pivot means.

8. The apparatus as defined in claim 1, including:

f. means at said one end of each of said arms supporting them for swinging vertically for supporting said lighting devices different heights.

9. The apparatus as defined in claim 2, including:

j. a wheel supported tripod supporting said boom support and boom for universal horizontal direction over the floor.

10. Photographic lighting apparatus comprising:

a. a mobile, wheel mounted boom support having a boom thereon extending laterally outwardly and upwardly therefrom providing an inner end at said support and an outer end spaced therefrom at a height spaced above a person to be photographed when such person is directly below said outer end;

b. a first arm and a second arm;

c. separative pivot means respectively supporting said first arm at one end thereof on the outer end of said boom, and supporting said second arm at one end thereof on said boom at a point intermediate said inner and outer ends of said boom for swinging movement of said first and second arms generally horizontally about their said one ends in arcuate paths between positions projecting oppositely outwardly from said boom;

d. a lighting device on each of the ends of said arms that are remote from said boom, each including electrical photographic lighting means in an electrical circuit extending to said boom support; and e. means at each of said pivot means respectively supporting each arm for swinging vertically for supporting the lighting device thereon at different heights, and holding means at each pivot means for releasably holding each arm stationary at any point in their movement.

11. Photographic lighting apparatus as defined in claim 10, including:

f. a camera support at the inner end of said boom for supporting a camera spaced below said inner end with its objective lens directed generally horizontally in approximately the same direction as said boom extends;

g. a tripod supporting said boom support and said camera support; and h. means mounting said camera support for tilting movement of said camera support relative to said boom support.

12. Photographic lighting apparatus as defined in claim 10, including:

f. a tripod having a head for supporting a camera thereon for vertical, tilting, and rotary movement;

g. means for removably supporting said boom support on said tripod independently of said camera and head.

* * * * *